(12) United States Patent
Kuroki et al.

(10) Patent No.: US 11,495,254 B2
(45) Date of Patent: Nov. 8, 2022

(54) MEDIA NON-CONTACTING MAGNETIC RECORDING HEAD

(71) Applicant: Western Digital Technologies, Inc., San Jose, CA (US)

(72) Inventors: Kenji Kuroki, Fujisawa (JP); Oscar Ruiz, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/184,549

(22) Filed: Feb. 24, 2021

(65) Prior Publication Data
US 2022/0115037 A1    Apr. 14, 2022

Related U.S. Application Data

(60) Provisional application No. 63/089,430, filed on Oct. 8, 2020.

(51) Int. Cl.
*G11B 5/48*    (2006.01)
*G11B 5/008*   (2006.01)
(Continued)

(52) U.S. Cl.
CPC ........ *G11B 5/4893* (2013.01); *G11B 5/00813* (2013.01); *G11B 5/02* (2013.01); *G11B 5/3103* (2013.01); *G11B 15/64* (2013.01)

(58) Field of Classification Search
None
See application file for complete search history.

(56) References Cited

U.S. PATENT DOCUMENTS 4,170,033 A * 10/1979 Ridgway .................. G11B 5/29
                                                  360/122
5,555,043 A *  9/1996 Brock ..................... G03B 17/24
                                                  396/320
(Continued)

FOREIGN PATENT DOCUMENTS

GB      2515051 A  * 12/2014 ......... G11B 5/00821
WO  WO-2014149055 A1 *  9/2014 ............ G11B 15/62

OTHER PUBLICATIONS

Beardsley, Irene A. et al., "Improved Calibration Techniques for High Density Tape Recording Systems", IEEE Transactions on Magnetics, vol. 28, No. 6, Nov. 1992, pp. 3417-3419.

(Continued)

*Primary Examiner* — William J Klimowicz
(74) *Attorney, Agent, or Firm* — Patterson & Sheridan, LLP; Steven H. VerSteeg

(57) ABSTRACT

The present disclosure generally relates to a head assembly of a data storage device. The data storage device may include magnetic media embedded in the device or magnetic media from an insertable cassette or cartridge (e.g., in an LTO drive), where the magnetic head assembly reads from and writes to the magnetic media. During drive operation, the magnetic media moves across the magnetic head assembly. The magnetic head assembly is spaced a distance from the magnetic media such that non-contact recording occurs between the magnetic head assembly and the magnetic media. The magnetic media is supported by either a back plate or an air film generated by one or more fillet edges of the back plate and the velocity of the magnetic media as the magnetic media moves across the magnetic head assembly.

15 Claims, 9 Drawing Sheets

(51) Int. Cl.
    *G11B 5/31*          (2006.01)
    *G11B 5/02*          (2006.01)
    *G11B 15/64*        (2006.01)

(56) References Cited

U.S. PATENT DOCUMENTS

| | | | |
|---|---|---|---|
| 5,870,924 | A | 2/1999 | Fahimi et al. |
| 5,883,770 | A * | 3/1999 | Biskeborn .............. G11B 5/255 |
| 5,976,668 | A * | 11/1999 | Chiba ................ G11B 5/73929 |
| 5,982,592 | A * | 11/1999 | Saito ....................... G11B 15/64 |
| 6,118,626 | A * | 9/2000 | Muftu .................... G11B 15/62 |
| | | | 360/122 |
| 7,054,101 | B1 * | 5/2006 | Marion ................... G11B 5/584 |
| 7,646,565 | B2 * | 1/2010 | Biskeborn ............ G11B 5/1872 |
| | | | 360/129 |
| 7,660,072 | B2 * | 2/2010 | Biskeborn ............ G11B 5/1871 |
| | | | 360/122 |
| 7,869,163 | B2 | 1/2011 | Berman et al. |
| 8,243,396 | B2 * | 8/2012 | Biskeborn ................ G11B 5/52 |
| | | | 360/291 |
| 9,087,553 | B2 | 7/2015 | Dellmann et al. |
| 9,734,854 | B2 * | 8/2017 | Engelen ............... G11B 5/1871 |
| 9,837,104 | B1 * | 12/2017 | Biskeborn ............. G11B 5/255 |
| 10,068,591 | B2 * | 9/2018 | Biskeborn ............... G11B 5/31 |
| 10,991,390 | B2 * | 4/2021 | Kobayashi ............. G11B 5/584 |
| 2006/0232884 | A1 | 10/2006 | Biskeborn |
| 2008/0170328 | A1 * | 7/2008 | Kawakami ......... G11B 5/00821 |
| | | | 360/122 |
| 2009/0052082 | A1 * | 2/2009 | Berman ................. G11B 15/64 |
| | | | 360/130.21 |
| 2009/0052087 | A1 * | 2/2009 | Berman ................. G11B 25/06 |
| | | | 360/235.4 |
| 2009/0231757 | A1 * | 9/2009 | Biskeborn ............ G11B 5/1871 |
| | | | 360/122 |
| 2012/0008234 | A1 * | 1/2012 | Biskeborn .............. G11B 15/60 |
| 2012/0183907 | A1 | 7/2012 | Biskeborn et al. |
| 2015/0364154 | A1 * | 12/2015 | Holmberg ............. G11B 15/62 |
| | | | 360/90 |
| 2016/0055867 | A1 * | 2/2016 | Engelen .................. G11B 5/60 |
| | | | 360/125.72 |
| 2016/0284377 | A1 * | 9/2016 | Sumiya ................ G11B 23/044 |
| 2018/0158472 | A1 * | 6/2018 | Biskeborn ............. G11B 5/187 |
| 2020/0258544 | A1 * | 8/2020 | Kobayashi ........... G11B 23/087 |
| 2020/0342905 | A1 * | 10/2020 | Yamaga .................. G11B 5/78 |
| 2022/0115037 | A1 * | 4/2022 | Kuroki .................. G11B 15/64 |
| 2022/0148618 | A1 * | 5/2022 | Yamaga ................ G11B 21/103 |

OTHER PUBLICATIONS

Manavi et al. "Optical Head Design for 1TB Optical Tape drive," 2000, 14 pages.

* cited by examiner

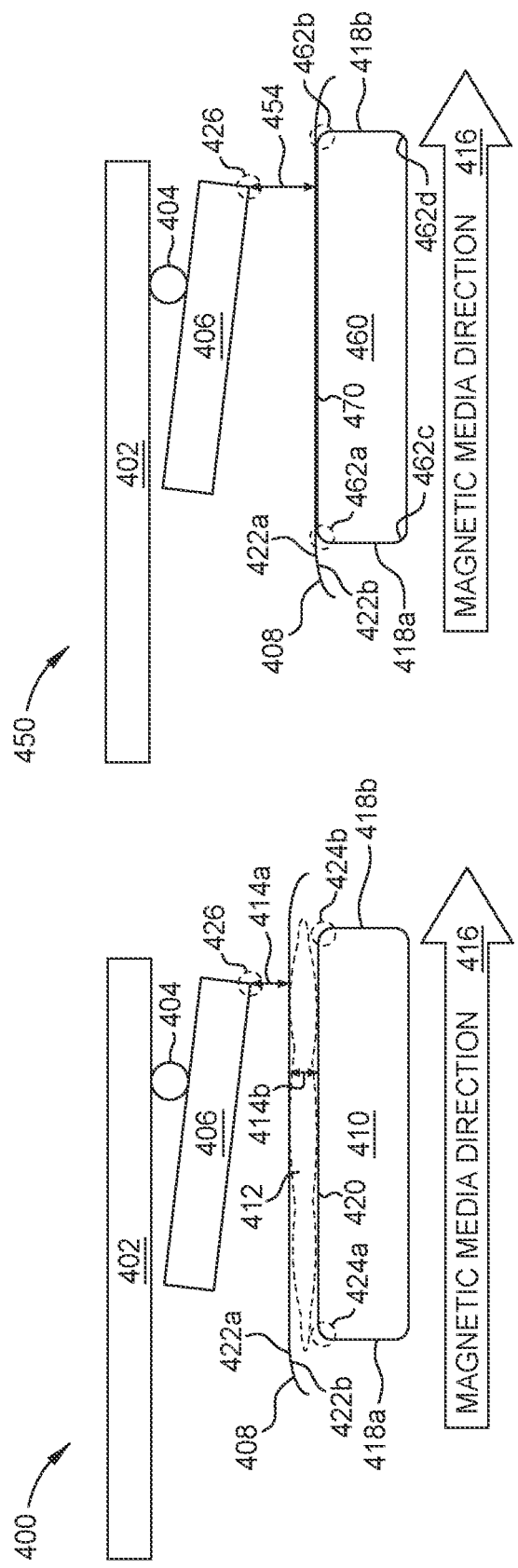

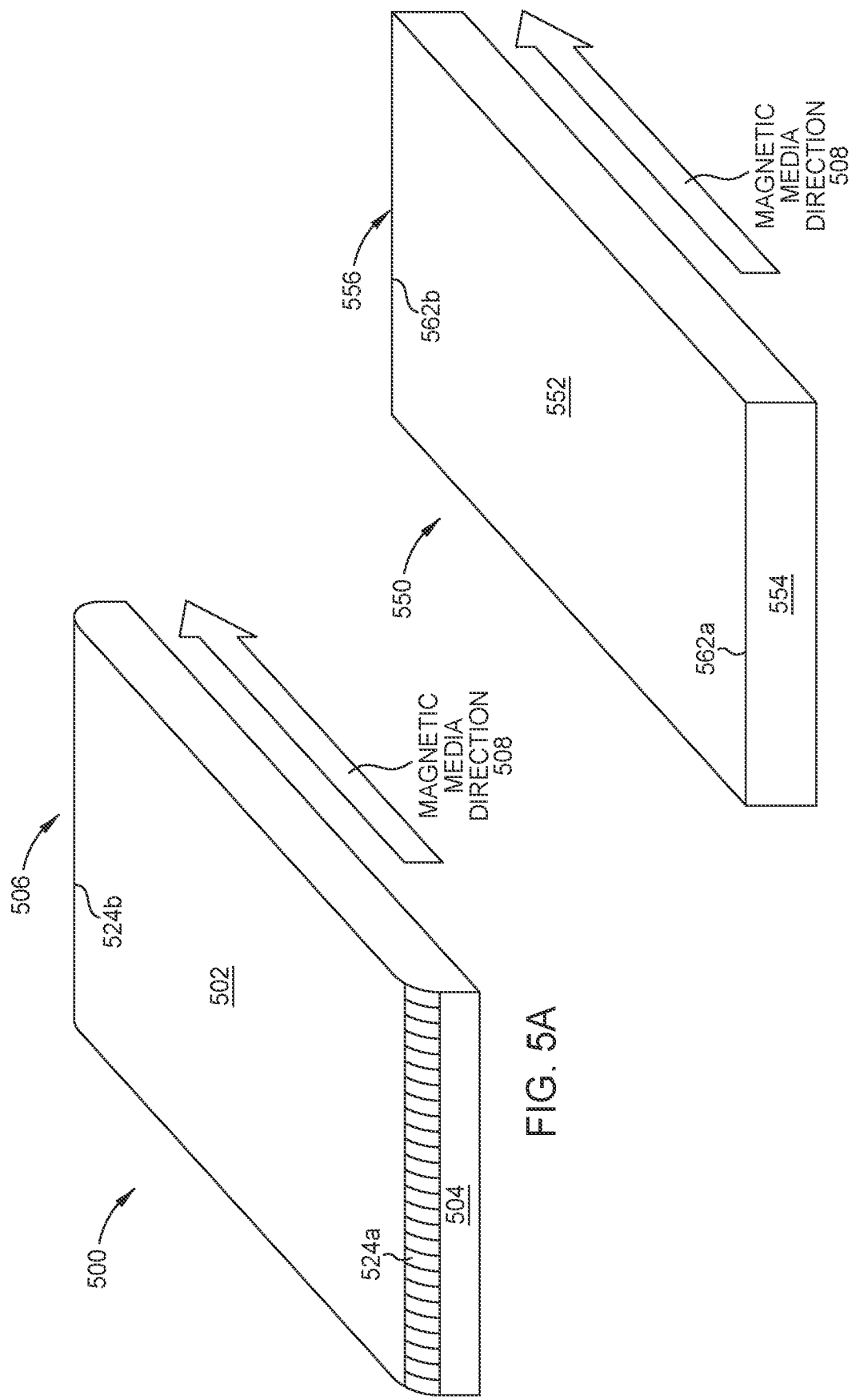

MEDIA NON-CONTACTING MAGNETIC RECORDING HEAD

CROSS-REFERENCE TO RELATED APPLICATIONS

This application claims benefit of U.S. provisional patent application Ser. No. 63/089,430, filed Oct. 8, 2020, which is herein incorporated by reference.

BACKGROUND OF THE DISCLOSURE

Field of the Disclosure

Embodiments of the present disclosure generally relate to a head assembly of a data storage device.

Description of the Related Art

Tape data storage is a system for storing digital information on magnetic tape using digital recording. Tape storage media is more commonly packaged in cartridges and cassettes. A tape drive performs writing or reading of data in the cartridges or cassettes. A common cassette-based format is LTO, which comes in a variety of densities.

Tape drives operate by using a tape head (i.e., magnetic recording head) to record and read back information from tapes by magnetic processes. The tape head comprises servo elements and data elements that are arranged in an array that is oftentimes referred to as a tape head array. Tape drives also have sensors as well as motors.

In operation, the tape drive system has many moving parts such as a tape (i.e., magnetic media) that moves between two reels. In between the two reels, the tape rolls over numerous rollers guiding the tape to a reading or writing position in front of the head. When the tape comes into contact with the tape head, the tape may experience contact stress that may result in the wear and tear of the tape, resulting in decreased lifespan and lower reliability.

Therefore, there is a need in the art for an improved tape drive system that reduces the wear and tear of the tape.

SUMMARY OF THE DISCLOSURE

The present disclosure generally relates to a head assembly of a data storage device. The data storage device may include magnetic media embedded in the device or magnetic media from an insertable cassette or cartridge (e.g., in an LTO drive), where the magnetic head assembly reads from and writes to the magnetic media. During drive operation, the magnetic media moves across the magnetic head assembly. The magnetic head assembly is spaced a distance from the magnetic media such that non-contact recording occurs between the magnetic head assembly and the magnetic media. The magnetic media is supported by either a back plate or an air film generated by one or more fillet edges of the back plate and the velocity of the magnetic media as the magnetic media moves across the magnetic head assembly.

In one embodiment, a data storage device comprises a magnetic recording head assembly configured to read from and write to a magnetic media, the assembly comprising a slider comprising one or more read elements and one or more write elements. The data storage device further comprises a back plate disposed adjacent to the slider, the back plate comprising a first surface having a roughness between about 5 nm and about 100 nm disposed at a media facing surface and one or more fillet edges disposed adjacent to the first surface. The magnetic media is disposed between the slider and the back plate.

In another embodiment, a data storage device comprises magnetic recording head assembly configured to read from and write to a magnetic media, the assembly comprising a load, a suspension coupled to the load, and a slider coupled to the suspension. The slider comprises one or more read elements and one or more write elements. The data storage device further comprises a back plate having one or more fillet edges disposed adjacent to the slider. The magnetic media is disposed between the slider and the back plate, the magnetic media comprising a first surface spaced a first distance from the slider and a second surface spaced a second distance from the back plate. The one or more fillet edges cause an air film to be disposed between the second surface of the magnetic media and the back plate, the air film supporting the magnetic media.

In another embodiment, the data storage device comprises a magnetic recording head assembly configured to read from and write to a magnetic media, the assembly comprising a slider comprising one or more read elements and one or more write elements. The data storage device further comprises a back plate having one or more right angle edges disposed adjacent to the slider. The magnetic media is disposed between the slider and the back plate. The magnetic media includes a first surface spaced a first distance from the slider and a second surface contacting the back plate.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4B illustrate an improved head assembly including a back plate, in accordance with some embodiments.

FIGS. 5A-5B illustrate a perspective view of a back plate, in accordance with some embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a head assembly of a data storage device. The data storage device may include magnetic media embedded in the device or magnetic media from an insertable cassette or cartridge (e.g., in an LTO drive), where the magnetic head assembly reads from and writes to the magnetic media. During drive operation, the magnetic media moves across the magnetic head assembly. The magnetic head assembly is spaced a distance from the magnetic media such that non-contact recording occurs between the magnetic head assembly and the magnetic media. The magnetic media is supported by either a back plate or an air film generated by one or more fillet edges of the back plate and the velocity of the magnetic media as the magnetic media moves across the magnetic head assembly.

Figure 1A:
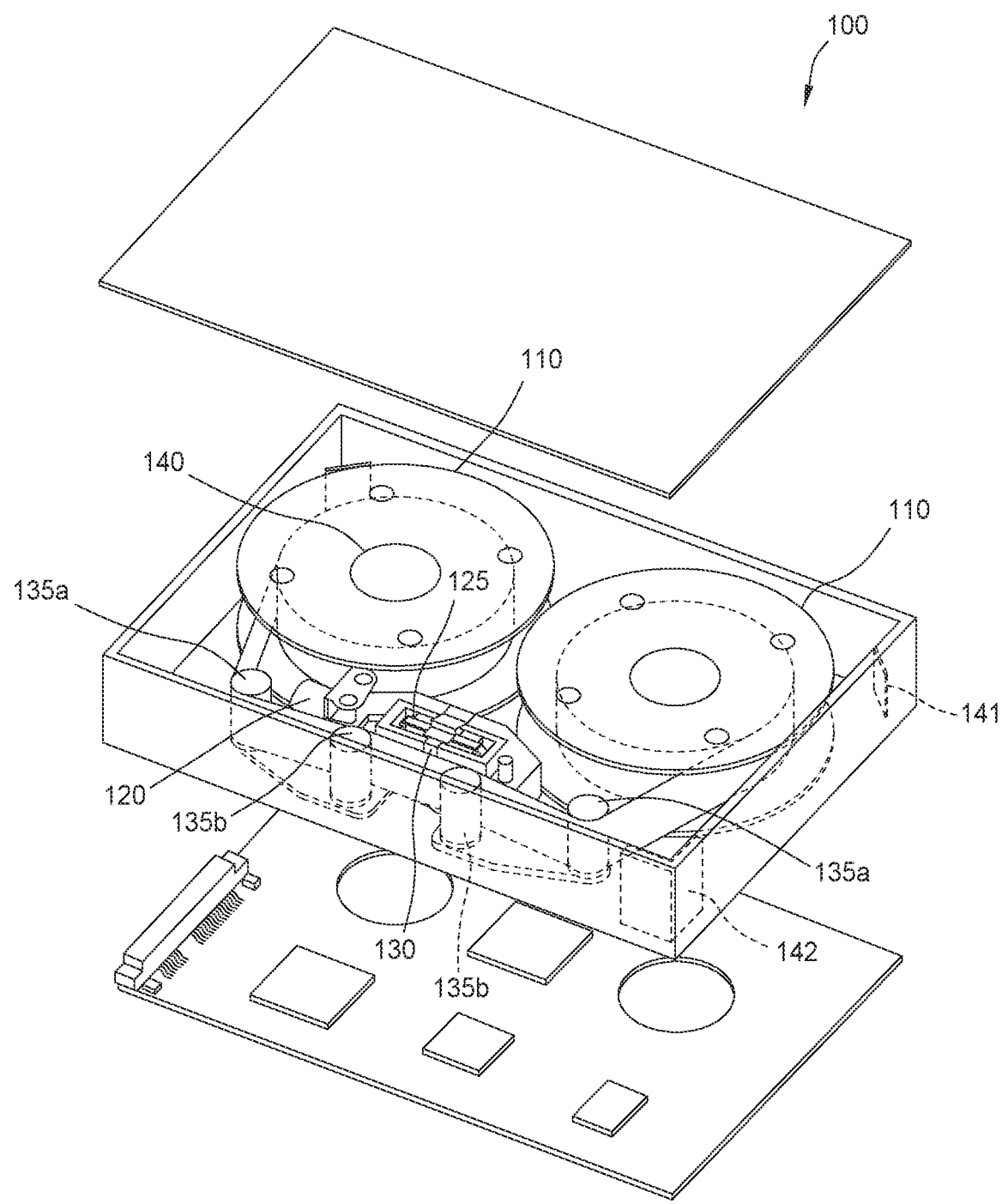
FIGS. 1A-1C illustrate a perspective exploded view and a simplified top down and side profile view of a tape embedded drive, in accordance with some embodiments.
Figure 1B:
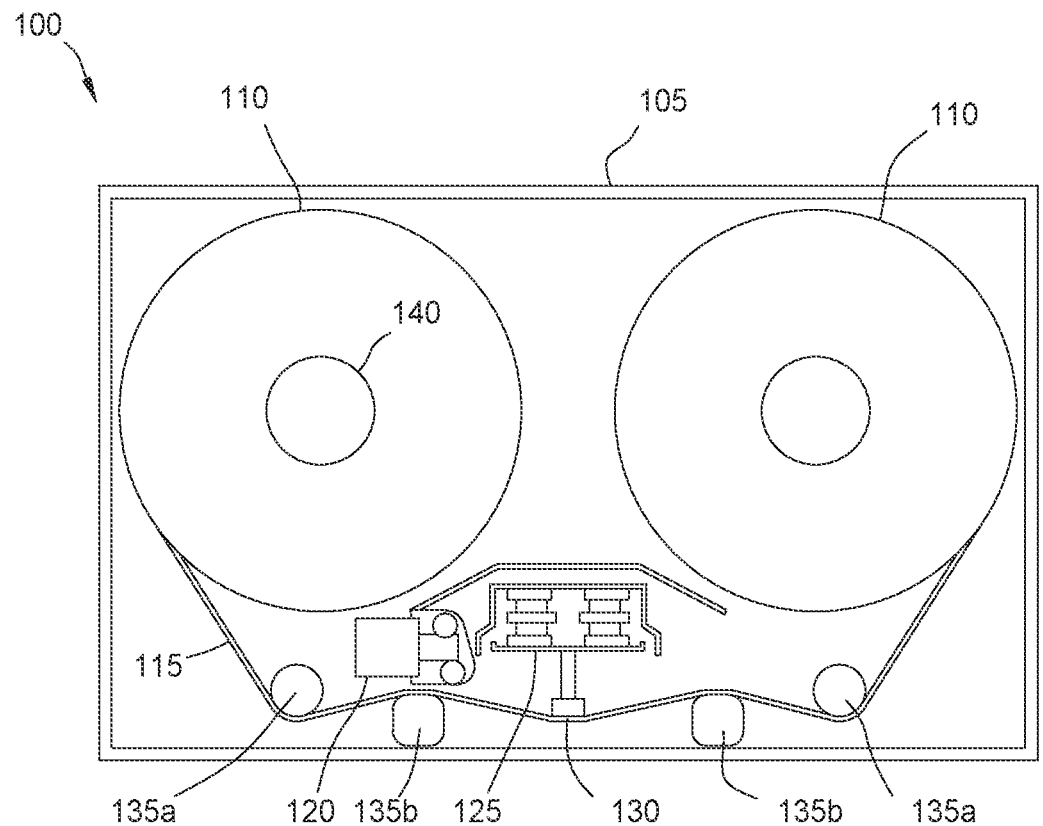
Figure 1C:
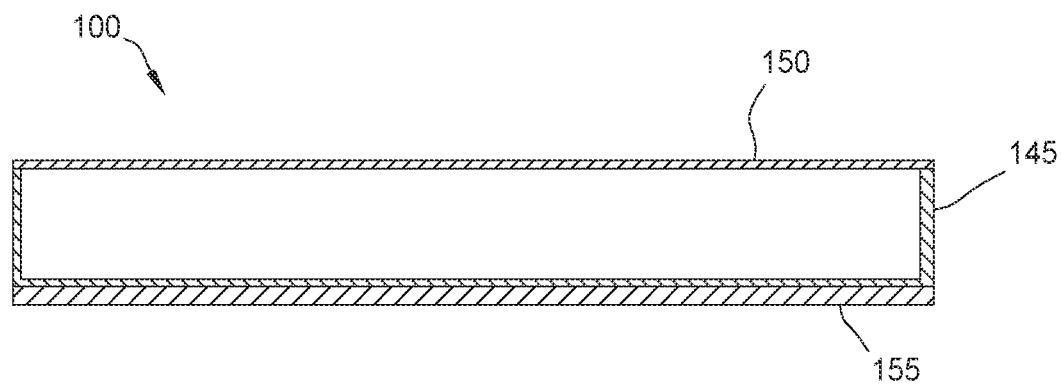

FIGS. 1A-1C illustrate a perspective exploded view and a simplified top down and side profile view of a tape embedded drive (TED) 100, in accordance with some embodiments. Focusing on FIG. 1B, for example, the tape embedded drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape embedded drive further comprises a printed circuit board assembly (PCBA). In an embodiment, most of the components are within an interior cavity of the casing, except the PCBA, which is mounted on an external surface of the casing. The same components are illustrated in a perspective view in FIG. 1A. In the descriptions herein, the term "tape" may be referred to as "magnetic media", interchangeably, for exemplary purposes.

It is to be understood that the magnetic recording head assembly discussed herein is applicable to a data storage device such as a hard disk drive (HDD) as well as a tape drive such as a tape embedded drive (TED) or an insertable tape media drive. An example TED is described in co-pending patent application titled "Tape Embedded Drive," application. Ser. No. 16/365,034, filed Mar. 31, 2019, assigned to the same assignee of this application. As such, any reference in the detailed description to a HDD or tape drive is merely for exemplification purposes and is not intended to limit the disclosure unless explicitly claimed. Furthermore, reference to or claims directed to magnetic recording devices are intended to include both HDD and tape drive unless HDD or tape drive devices are explicitly claimed.

It is also to be understood that aspects disclosed herein, such as the magnetoresistive devices, may be used in magnetic sensor applications outside of HDD's and tape media drives such as TED's, such as spintronic devices other than HDD's and tape media drives. As an example, aspects disclosed herein may be used in magnetic elements in magnetoresistive random-access memory (MRAM) devices (e.g., magnetic tunnel junctions as part of memory elements), magnetic sensors or other spintronic devices.

In the illustrated embodiments, two tape reels 110 are placed in the interior cavity of the casing, with the center of the two tape reels on the same level in the cavity and with the head assembly 130 located in the middle and below the two tape reels. Tape reel motors located in the spindles of the tape reels can operate to wind and unwind the tape media 115 in the tape reels. Each tape reel may also incorporate a tape folder to help the tape media 115 be neatly wound onto the reel. The tape media may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels are biased against the guides/rollers 135a, 135b (collectively referred to as guides/rollers 135) and are movably passed along the head assembly 130 by movement of the reels. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor and stepping motor may variably position the tape head(s) transversely with respect to the width of the recording tape. The stepping motor may provide coarse movement, while the voice coil motor may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape embedded drive 100 within the casing. In particular, as the head mechanism is internal to the casing in certain embodiments, the tape media 115 may not be exposed to the outside of the casing, such as in conventional tape drives. Thus, the tape media 115 does not need to be routed along the edge of the casing and can be freely routed in more compact and/or otherwise more efficient ways within the casing. Similarly, the head(s) and tape reels may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA is made of solid state electronics, environmental issues are less of a concern, so it does not need to be placed inside the casing 105. That leaves room inside casing for other components, particularly, the moving components and the tape media 115 that would benefit from a more protected environment.

In some embodiments, the tape embedded drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing.

In one embodiment, the cover 150 is used to hermetically seal the tape embedded drive. For example, the drive 100 may be hermetically sealed for environmental control by attaching (e.g., laser welding, adhesive, etc.) the cover to the base 145. The drive 100 may be filled by helium, nitrogen, hydrogen, or any other typically inert gas.

In some embodiments, other components may be added to the tape embedded drive 100. For example, a pre-amp for the heads may be added to the tape embedded drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

Figure 2:
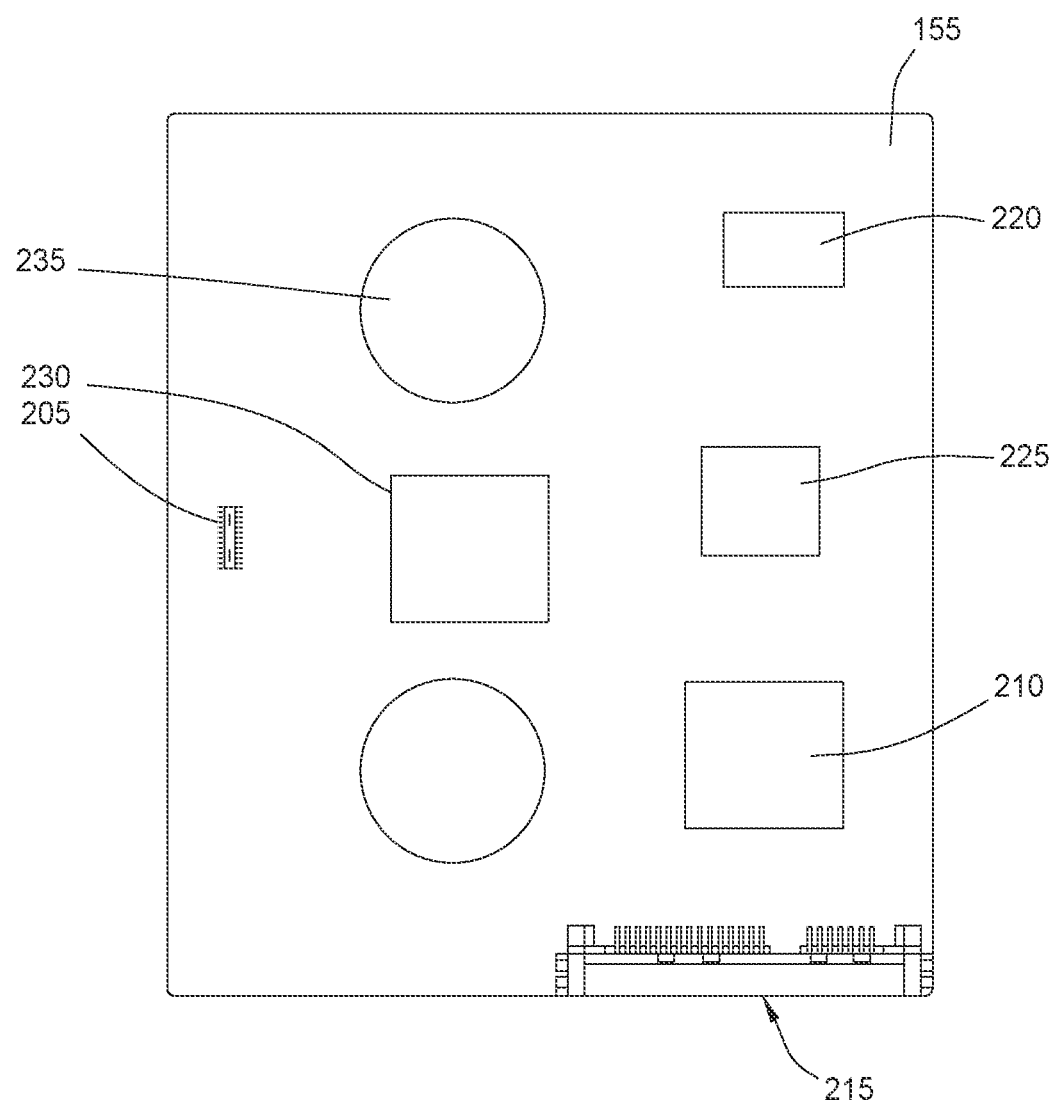
FIG. 2 illustrates a top perspective view of a printed circuit board assembly (PCBA) of the tape embedded drive, in accordance with some embodiments.

FIG. 2 illustrates a top perspective view of a printed circuit board assembly (PCBA) 155 of the tape embedded drive 100, in accordance with some embodiments. The PCBA 155 of the tape embedded drive may be the PCBA 155 of FIG. 1. The PCBA 155 is attached to the bottom surface of the casing, with a connector 205 attaching to contacts or an interface on the bottom surface electrically/electronically connected to internal components in the casing. For example, the contacts or interface may be electrically connected to one or more motors and/or actuators within the casing. In one embodiment, the contacts/interface are built into the casing without comprising an air tight seal of the casing. In some embodiments, the connector 205 may be an electrical feed-through electrically connecting components inside the casing to those on the PCBA, while maintaining sealing of the casing.

The PCBA 155 can include various components, such as one or more controllers, one or more connectors 205, a system on a chip (SoC) 210, one or more data interfaces 215 (e.g., Serial ATA (SATA), Serial Attached SCSI (SAS), non-volatile memory express (NVMe), or the like), a memory 220, a Power Large Scale Integration (PLSI) 225, and/or data read channel controller 230. One or more cutouts 235 can be added in the PCBA 155 to provide additional space for tape reel motors, if needed. For example, the portion of the casing above the tape reel motors may be raised to provide additional space for the motors. By providing cutouts 235, the thickness of the tape embedded drive 100 may be reduced as the PCBA 155 may surround the raised portion of the casing.

The PCBA 155 may extend along the entire bottom exterior surface of the casing 105 or may only partially extend along the surface, depending on how much space the various components need. In some embodiments, a second PCBA 155 may be located internally in the casing 105 and be in communication with the first PCBA 155, for example, via the connector 205.

In some embodiments, a controller on the PCBA 155 controls the read and write operations of the tape embedded drive 100. The controller may engage the tape spool motors and cause the tape spools to wind the tape film forwards or backwards. The controller may use the stepping motor and the voice coil motor to control placement of the head(s) over the tape film. The controller may also control output/input of data to or from the tape embedded drive 100 through the one or more interfaces 215, such as SATA or SAS.

While the above discusses the tape embedded drive 100 as having a casing with a 3.5 inch form factor like that of HDDs, the tape embedded drive 100 may use other form factors. For example, if tape technology become sufficiently miniaturized in the future, then the tape embedded drive could use a 2.5 inch drive form factor, like that used by laptop HDDs. In some embodiments, where larger sizes are desired, the tape embedded drive 100 may use a 5.25 inch drive form factor for the casing, such as those used by computer CD-ROMs. Furthermore, the tape embedded drive 100 may use the 3.5 inch form factor with some variations. For example, the drive may be slightly longer/shorter, slightly thicker/thinner, or the like. Even with slight differences in dimensions or placement of data/power interfaces, the drive 100 may still be compatible with existing 3.5 inch drive form factor based infrastructure found in various computer equipment, such as racks and servers.

Figure 3:
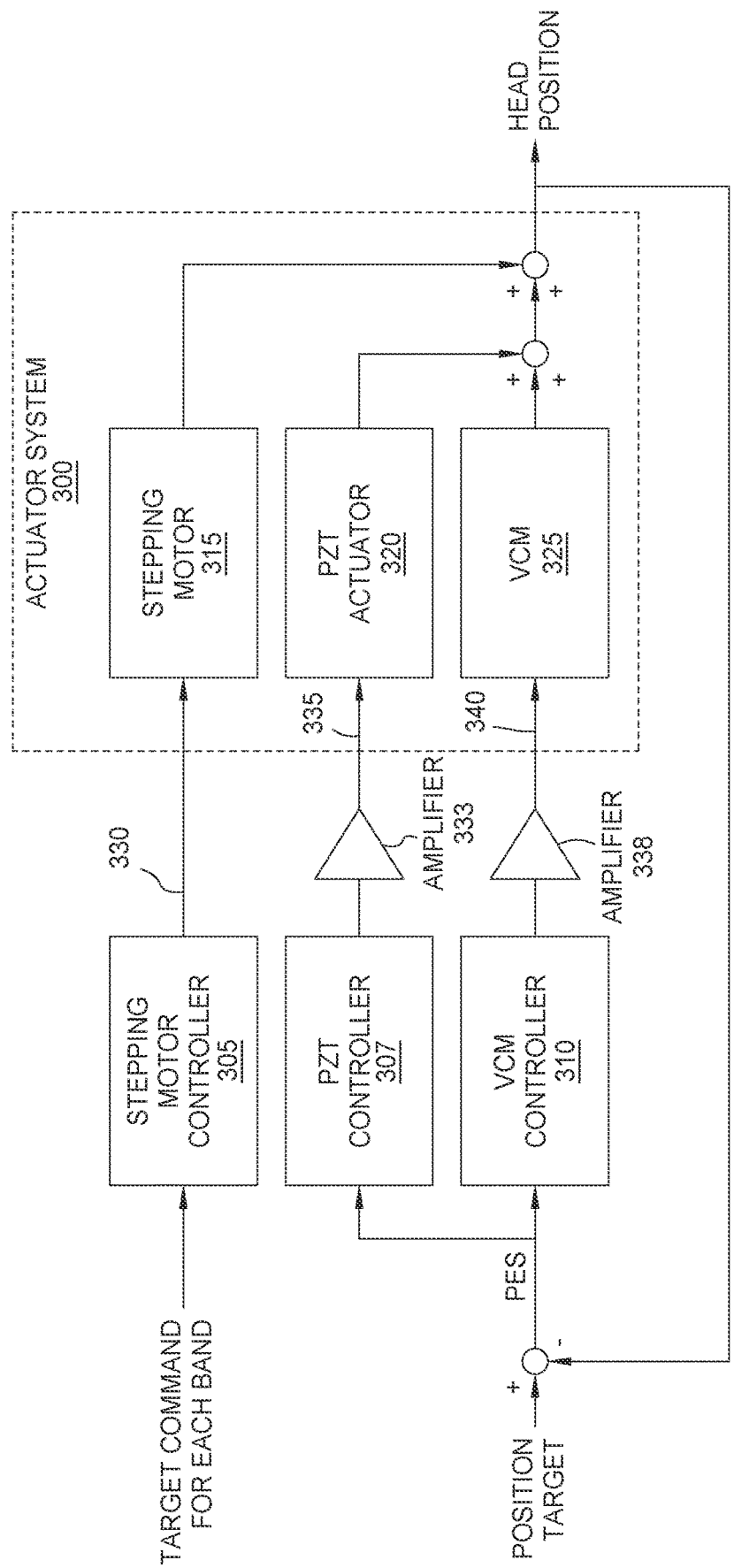
FIG. 3 illustrates a control block diagram for a servo-mechanical system of the tape embedded drive, in accordance with some embodiments.

FIG. 3 illustrates a control block diagram for a servomechanical system, such as an actuator system 300, of the tape embedded drive 100, in accordance with some embodiments. The control logic for the system may be implemented as a process in one or more controllers of the tape embedded drive 100, such as the SoC and/or PLSI in the PCBA and used to control one or more motors and/or one or more actuators.

In an embodiment, a stepping motor controller 305, a PZT controller 307, and a VCM controller 310 work together to control a stepping motor 315, a PZT actuator 320, and a VCM 325 to coordinate the movement of the head(s) in response to a target command.

As discussed above, the stepping motor 315 may provide coarse movement, the VCM 325 may provide fine movement, and the PZT actuator 320 may provide very fine movement. For example, assuming a 12.65 mm tape width, the stepping motor stroke may be about 12.65 mm, with the VCM stroke at about 4 mm, and the PZT stroke at about 4 μm. In this embodiment, the various strokes creates a movement ratio of about 30,000:10,000:1 (stepping motor: VCM:PZT actuator). In other embodiments, the ratios may be different based on the performance specifications of the motors and the actuators.

A first control signal 330 is sent from the stepping motor controller to the stepping motor. The head(s) are then moved in a coarse movement. In an embodiment, a head position sensor detects the position of the head(s) after the first movement and provides a positive error signal (PES) to the VCM and PZT controllers. In response, the VCM and the PZT controllers may further move the head(s) in a fine and a very fine movement, respectively, if needed, to place the head(s) into the desired position.

A first amplifier 333 may be positioned in between the PZT controller 307 and the PZT actuator 320 to amplify a second control signal 335. A second amplifier 338 may be positioned in between the VCM controller 310 and the VCM 325 to amplify a third control signal 340.

In an embodiment, the PZT actuator 320 and the VCM 325 move the head(s) serially. The VCM first moves the head(s) and then, if the head(s) are within a first threshold distance from the target position, the PZT actuator 320 may take over the movement of the head(s) for very fine movements. In another embodiment, the PZT actuator 320 and the VCM 325 may move the head(s) in parallel. It should be noted that although PZT is used throughout in the description of the control system of FIG. 3, as disclosed above, other types of actuators may be used in place of PZTs, and the system of FIG. 3 may be adapted accordingly in other embodiments.

FIGS. 4A and 4B illustrate magnetic recording head assemblies 400, 450, respectively, comprising back plates, in accordance with some embodiments. Each magnetic recording head assembly 400, 450 comprises a magnetic recording head including a load 402, a suspension 404 coupled to the load 402, and a slider 406 coupled to the suspension 404. The slider 406 includes one or more read elements and one or more write elements (not shown). The back plate 410 of FIG. 4A is disposed adjacent to the slider 406, where a magnetic media 408 is located between the slider 406 and a first surface 420 of the back plate 410. The first surface 420 of the back plate 410 is disposed at a media facing surface (MFS). Similarly, the back plate 460 of FIG. 4B is disposed adjacent to the slider 406, where the magnetic media 408 is located between the slider 406 and a first surface 470 of the back plate 460. The first surface 470 of the back plate 460 is disposed at the MFS. Each back plate 410, 460 individually includes a leading edge surface 418a and a trailing edge surface 418b.

Data is magnetically written to the magnetic media 408 by the one or more write elements of the slider 406 and read from the magnetic media 408 by the one or more read elements of the slider 406. The magnetic media 408 moves over each back plate 410, 460 in the direction of the arrow labeled magnetic media direction 416. The arrow labeled magnetic media direction 416 is not intended to be limiting, and in some embodiments, the magnetic media direction may be in the opposite direction. The magnetic media 408 comprises a first surface 422a disposed adjacent to the slider 406 and a second surface 422b disposed adjacent to each back plate 410, 460.

Figure 4C:
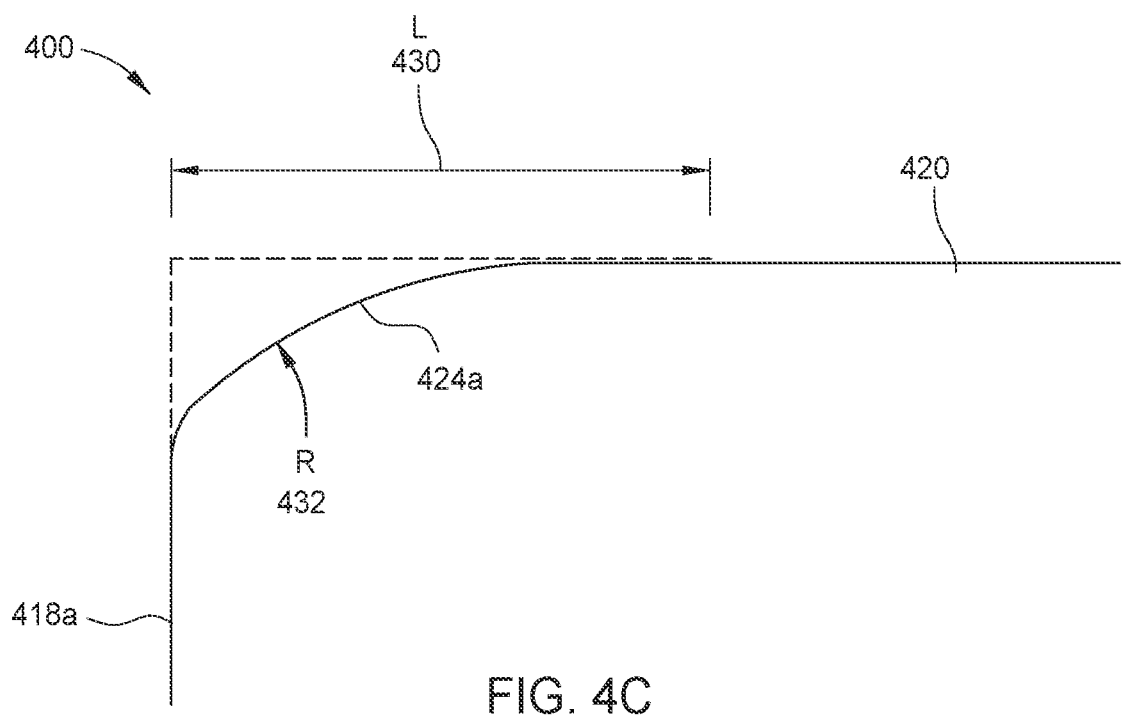
FIGS. 4C-4G illustrate various fillet edges of the back plate of FIG. 4A, according to various embodiments.

FIG. 4A illustrates a back plate 410 comprising one or more fillet edges 424a, 424b (i.e., rounded edges or curved edges), according to some embodiments. FIGS. 4C-4G illustrate various fillet edges of the back plate 410 of FIG. 4A, according to various embodiments. A first fillet edge 424a is disposed at a leading edge surface 418a of the back plate 410 and the MFS and a second fillet edge 424b is disposed at a trailing edge surface 418b of the back plate 410 and the MFS. For example, a first surface 420 of the back plate 410 disposed at the MFS couples the first fillet edge 424a to the second fillet edge 424b. While two fillet edges 424a, 424b are shown, the number of fillet edges is not intended to be limiting.

Figure 4D:
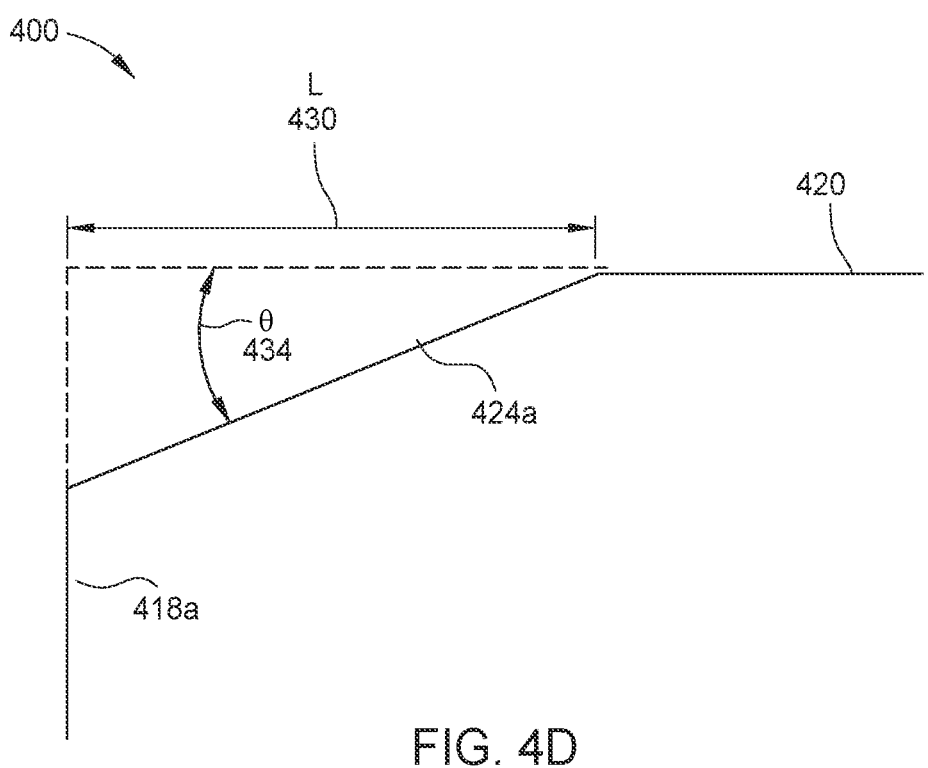
Figure 4E:
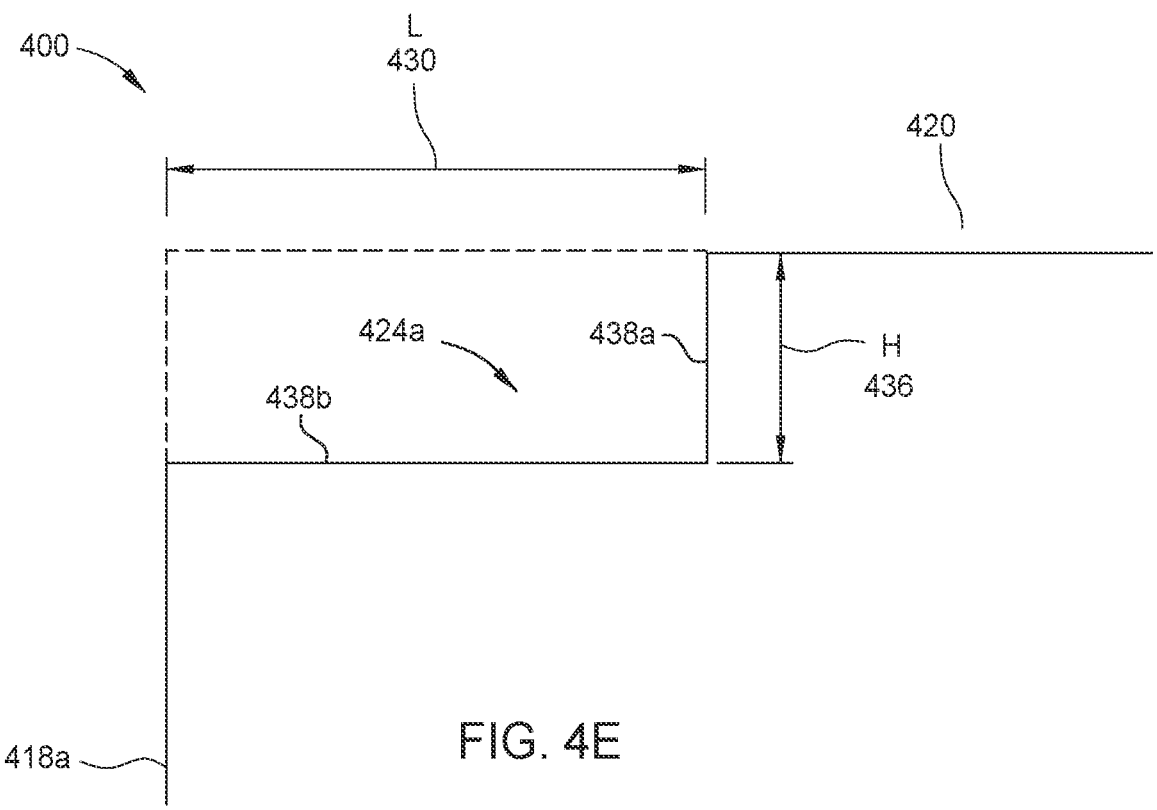
Figure 4F:
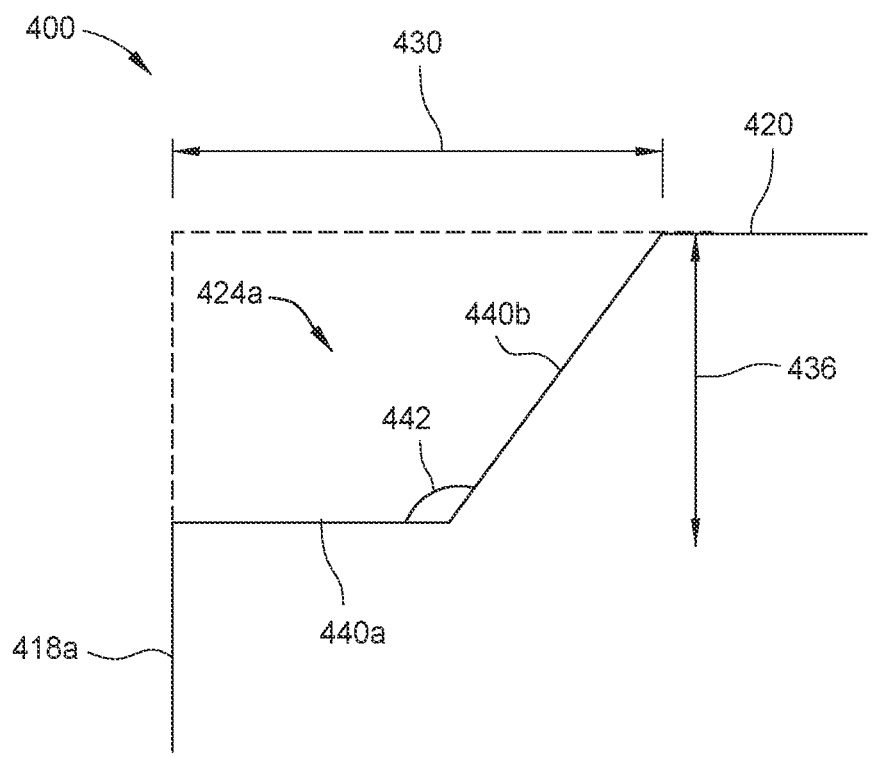
Figure 4G:
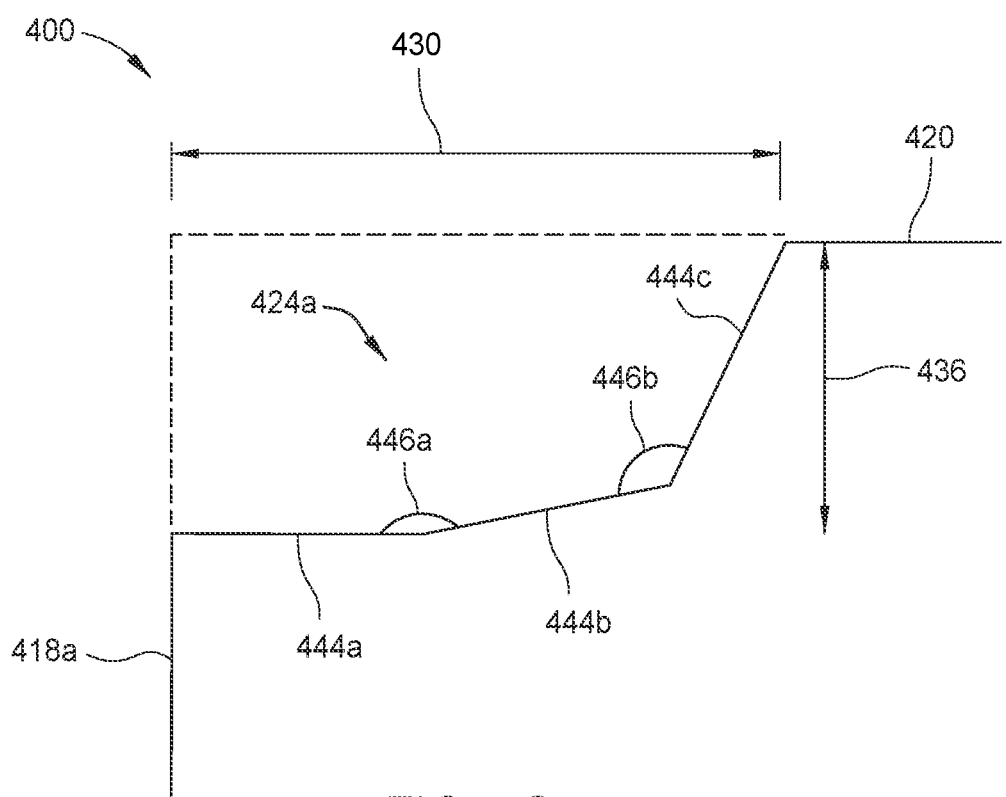

Each of the one or more fillet edges 424a, 424b can be one of three types: an arc, a straight chamfer, or a step, as shown and described in FIGS. 4C-4E. FIG. 4C illustrates an embodiment of the arc type fillet edge, FIG. 4D illustrates an embodiment of the straight chamfer type fillet edge, and FIGS. 4E-4G illustrate embodiments of the step type fillet edge. While FIGS. 4C-4G shown only the first fillet edge 424a, FIGS. 4C-4G and the below measurements apply to the second fillet edge 424b as well. As such, while the leading edge surface 418a is referred to in the description of FIGS. 4C-4G, the leading edge surface 418a is interchangeable with the trailing edge surface 418b.

In FIGS. 4C-4G, each fillet edge 424a, 424b has a length 430 measured from the leading edge surface 418a (or the trailing edge surface 418b) to the first surface 420 disposed as the MFS. For example, the length 430 of the first and second fillet edges 424a, 424b may be between about 0.01 mm and about 0.50 mm. The fillet edge 424a of the arc type shown in FIG. 4C may have a curvature 432 between about 0.2 mm R and about 5.0 mm R, where R describes a radius. Because curvature is an inverse relationship (i.e., 1/R), a larger radius refers to a less curved fillet edge and a smaller radius refers to a more curved fillet edge. For example, the curvature of the section of a circle with a radius of 100 units is greater than the curvature of the section of a circle with a radius of 200 units, where curvature refers to how curved the section is.

The fillet edge 424a of the chamfer type shown in FIG. 4D is disposed at an angle 434 between the leading edge surface 418a and the first surface 420 of about 0.01 degrees to about 2.0 degrees. The fillet edge 424a of the step types shown in FIGS. 4E-4G may comprise one or more steps (e.g., a single step or multiple steps) produced with a lithographic mask by chemical or ion mill etching. For example, a single step, or the sum of multiple steps, may have a depth or height 436 recessed from the first surface 420 between about 10 nm to about 1000 nm. FIG. 4E illustrates a single step type fillet edge 424a comprising a first surface 438a substantially parallel to the leading edge surface 418a and a second surface 438b disposed substantially perpendicular to the first surface 438a. FIG. 4F illustrates a single step type fillet edge 424a comprising a first surface 440a disposed substantially perpendicular to the leading edge surface 418a and a second surface 440b disposed at a first angle 442 from the first surface 440a. The first angle 442 is between about 150 degrees to about 175 degrees, for example. The single step fillet edge 424a of FIG. 4F may be formed by a chemical etching.

FIG. 4G illustrates a multistep fillet edge 424a comprising a first surface 444a disposed substantially perpendicular to the leading edge surface 418a, a second surface 444b disposed at a first angle 446a to the first surface 444a, and a third surface 444c disposed at a second angle 446b to the second surface 444b. For example, the first angle 446a is between about 170 degrees to about 179 degrees, and the second angle 446b is between about 95 degrees to about 120 degrees. The multistep fillet edge 424a of FIG. 4G may be formed by ion milling. While three surfaces 444a-444c are shown in FIG. 4G, the multistep type may comprise a greater or fewer number of surfaces, such as four or more. The previously listed values and measurements of FIGS. 4C-4G are not intended to be limiting, but to provide an example of a possible embodiment.

Referring back to FIG. 4A, the first surface 422a of the magnetic media 408 faces the slider 406 and the second surface 422b of the magnetic media 408 disposed opposite to the first surface 422a faces the back plate 410. The second surface 422b of the magnetic media 408 has a surface roughness greater than about 1 nm, such as about 5 nm to about 100 nm. As a comparison, conventional magnetic media have a surface roughness of less than about 0.5 nm. In some embodiments, the second surface 422b of the magnetic media 408 has a surface roughness greater than about 10 nm (e.g., greater than the surface roughness of conventional magnetic media by a magnitude). Additionally, the first surface 420 of the back plate 410 disposed adjacent to the second surface 422b of the magnetic media 408 has a surface roughness greater than about 1 nm, such as about 5 nm to about 100 nm. As a comparison, conventional back plates have a surface roughness of less than about 0.5 nm. In some embodiments, the first surface 420 of the back plate 410 disposed adjacent to the second surface 422b has a surface roughness greater than about 10 nm (e.g., greater than the surface roughness of conventional back plates by a magnitude).

As data is written to and read from the magnetic media 408, the first surface 422a of the magnetic media 408 is spaced a first distance 414a from a bottom point 426 of the slider 406, where the bottom point 426 is the closest point of the slider 406 to the magnetic media 408. The first distance 414a is between about 5 nm and about 50 nm. Furthermore, the magnetic media 408 moves at a velocity as the magnetic media 408 travels in the magnetic media direction 416 over the back plate 410 during read and write operations. The velocity at which the magnetic media 408 moves may be between about 1 m/s and about 15 m/s, for example.

When the magnetic media 408 moves over the first fillet edge 424a (i.e., the leading surface fillet edge) during read and write operations, an air film 412 or air pocket is formed between the first surface 420 of the back plate 410 and the second surface 422b of the magnetic media 408, effectively preventing the magnetic media 408 from contacting the back plate 410. In other words, the magnetic media 408 is supported by the air film 412 rather than by the back plate 410 itself. The air film 412 forms due to a combination of factors including the velocity of the magnetic media 408, the first and second fillet edges 424a-424b, the surface roughness of the second surface 422b of the magnetic media 408, and the surface roughness of the first surface 420 of the back plate 410. The air film 412 has a thickness such that the second surface 422b of the magnetic media 408 is spaced a second distance 414b from the first surface 420 of the back plate 410. While the term "air film" is used, it is not intend it to be limiting, and the air film can be of a different gas composition other than that of air. For example, in some embodiments, the air film 412 may comprise helium, a mixture of helium and oxygen, or a mixture including nitrogen and other gases.

The curvature of the one or more fillet edges 424a-424bd may affect the thickness (i.e., the second distance 414b) of the air film 412. For example, a more curved first and second fillet edge 424a, 424b may cause a thicker air film 412 to be formed while a less curved first and second fillet edge 424a, 424b may cause a thinner air film 412 to be formed. The second distance 414b is between about 10 nm and about 300 nm, such that a thicker air film 412 may be closer to the upper bound of about 300 nm and a thinner air film 412 may be closer to the lower bound of about 10 nm. The air film 412 provides support to the magnetic media 408, enabling the magnetic media to be stable and firm during the read and write operations of the magnetic recording head assembly 400. Thus, utilizing the air film 412 to support the magnetic media 408 enables the magnetic spacing to be reduced, resulting in a higher recording density, without using a smoother magnetic media or a thinner head overcoat.

FIG. 4B illustrates a back plate 460 that includes one or more right angle edges 462a-462d (i.e., squared edges), according to some embodiments. A first right angle edge 462a is disposed at a leading surface edge of the back plate 460 and the MFS and a second right angle edge 464b is disposed at a trailing surface edge of the back plate 460 and the MFS. For example, the first surface 470 of the back plate 460 disposed at the MFS couples the first right angle edge 462a to the second right angle edge 462b, the leading edge surface 418a couples the first right angle edge 462a to a third right angle edge 462c, and a trailing edge surface 418b couples the second right angle edge 462b to a fourth right angle edge 462d. The one or more right angle edges 462a-462d may be considered skiving edges. The one or more right angle edges 462a-462d are defined by two surfaces of the back plate 460 meeting at approximately 90 degree angles. In some embodiments, the two surfaces defining the one or more right angle edges 462a-462d may be disposed at angles less than or greater than 90 degrees (e.g., 80 degrees to 100 degrees).

The second surface 422b of the magnetic media 408 facing the back plate 460 has a surface roughness greater than about 1 nm, such as about 5 nm to about 100 nm. As a comparison, conventional magnetic media have a surface roughness of less than about 0.5 nm. In some embodiments, the second surface 422b of the magnetic media 408 has a surface roughness greater than about 10 nm (e.g. greater than the surface roughness of conventional magnetic media by a magnitude). Additionally, the first surface 470 of the back plate 460 disposed adjacent to the second surface 422b of the magnetic media 408 has a surface roughness greater than about 1 nm, such as about 5 nm to about 100 nm. As a comparison, conventional back plates have a surface roughness of less than about 0.5 nm. In some embodiments, the first surface 470 of the back plate 460 disposed adjacent to the second surface 422b has a surface roughness greater than about 10 nm (e.g. greater than the surface roughness of conventional back plates by a magnitude).

As data is written to and read from the magnetic media 408, the first surface 422a of the magnetic media 408 is spaced a first distance 454 from a bottom point 426 of the slider 406, where the bottom point 426 is the closest point of the slider 406 to the magnetic media 408. The first distance 454 is between about 3 nm and about 25 nm. Due to negative pressure, the second surface 422b of the magnetic media 408 is in contact with the first surface 470 of the back plate 460 (i.e., spaced a distance of 0 nm), effectively eliminating any air pockets or air films. Negative pressure results when the absolute air bearing pressure is still above zero pressure but is below the external ambient pressure. The net pressure, which is the difference between the absolute air bearing pressure and the external ambient pressure, is then negative. While the term "air bearing" is used, it is not intend it to be limiting, and the air referred to may be a different gas composition other than that of air. For example, in some embodiments, the air referred to may be helium, a mixture of helium and oxygen, or a mixture including nitrogen and other gases. During read and write operations, the magnetic media 408 contacts the back plate 460 at the first right angle edge 462a, the second right angle edge 462b, and the first surface 470.

As the magnetic media 408 moves in the magnetic media direction 416 at a velocity of about 1 m/s to about 15 m/s, the back plate 460 provides support to the magnetic media 408 such that the magnetic media 408 is stable and firm during the read and write operations of the magnetic recording head assembly 450. Because the magnetic media 408 and the first surface 470 of the back plate 460 are in contact with each other, the magnetic media 408 experiences friction from the magnetic media 408 rubbing against the back plate 460. However, the surface roughness of the second surface 422b of the magnetic media 408 and the surface roughness of the first surface 470 of the back plate 460 prevent stiction. Thus, the back plate 460 contacting and directly supporting the magnetic media 408 enables the magnetic spacing to be reduced, resulting in a higher recording density, without using a smoother magnetic media or a thinner head overcoat.

FIGS. 5A and 5B illustrates of perspective views of back plates 500, 550, respectively, in accordance with some embodiments. Aspects of FIGS. 5A and 5B may be similar to the aspects described in FIGS. 4A and 4B, respectively. In the back plate 500 of FIG. 5A, a first fillet edge 524a is disposed between a leading edge surface 504 and a first surface 502 disposed at the MFS, and a second fillet edge 524b is disposed between a trailing edge surface 506 (not shown) and the first surface 502. The first and the second fillet edges 524a, 524b may be the first and second fillet edges 424a, 424b of FIG. 4A. Moreover, the first and second fillet edges 424a, 424b may be the arc type, chamfer type, or step type described in FIGS. 4C-4G.

The first and the second fillet edges 524a, 524b may each have a length from the leading edge surface 504 and the trailing edge surface 506, respectively, to the first surface 502 between about 0.01 mm to about 0.50 mm. The first and the second fillet edges 524a, 524b may each have a curvature of between about 0.2 mm R and about 5.0 mm R where R describes a radius, an angle between about 0.01 degrees and 2.0 degrees, or a step have a depth or height between about 10 nm to about 1000 nm. When the magnetic media, such as the magnetic media 408, moves in the magnetic media direction 508 over the first surface 502 of the back plate 500, an air film or air pocket is disposed between the magnetic media and the back plate 500 such that the magnetic media does not directly contact the first and second fillet edges 524a, 524b or the first surface 502.

In the back plate 550 of FIG. 5B, a first right angle edge 562a is disposed between a leading surface 554 and a first surface 552 disposed at the MFS, and a second right angle edge 562b is disposed between a trailing surface 556 (not shown) and the first surface 552. In other words, the leading surface 554 and the first surface 552 meet at a substantially 90 degree angle to form the first right angle edge 562a, and the trailing surface 556 and the first surface 552 meet at a substantially 90 degree angle to form the second right angle edge 562b. The first and the second right angle edges 562a, 562b may be the first and second right angle edges 462a, 462b of FIG. 4B. The first and second right angle edges 562a, 562b may be considered skiving edges. When the magnetic media, such as the magnetic media 408, moves in the magnetic media direction 508 over the first surface 552 of the back plate 550, the magnetic media contacts the first and second right angle edges 562a, 562b and the first surface 552.

By introducing a supporting element, such as a back plate or an air film induced by the back plate and the velocity of the magnetic media, the flexible magnetic media may be supported and kept firm. As such, read and write operations of a magnetic read head can successfully occur without physically contacting the magnetic media. Moreover, supporting the magnetic media using a back plate or an air film reduces the magnetic spacing, resulting in a higher recording density. Since a smoother magnetic media or a thinner head overcoat are not utilized to lower the magnetic spacing, the magnetic recording head is more reliable than conventional magnetic recording heads.

In one embodiment, a data storage device comprises a magnetic recording head assembly configured to read from and write to a magnetic media, the assembly comprising a slider comprising one or more read elements and one or more write elements. The data storage device further comprises a back plate disposed adjacent to the slider, the back plate comprising a first surface having a roughness between about 5 nm and about 100 nm disposed at a media facing surface and one or more fillet edges disposed adjacent to the first surface. The magnetic media is disposed between the slider and the back plate.

An air film is disposed between the first surface of the back plate and the magnetic media. The magnetic media is spaced a first distance from the back plate between about 10 nm and about 300 nm. The one or more fillet edges are two fillet edges disposed adjacent to the first surface of the back plate. Each of the fillet edges is an arc, a straight chamfer, or stepped. A first fillet edge of the one or more fillet edges is disposed at a leading edge surface of the back plate. The first fillet edge has length from the leading edge surface of the back plate to the first surface of the back plate between about 0.01 mm and about 0.50 mm. The first fillet edge has a curvature between about 0.2 mm R to about 5.0 mm R. The first fillet edge is recessed a depth of about 10 nm to about 1000 nm from the first surface. The first fillet edge is disposed at an angle between the first surface and the leading edge surface of about 0.01 degrees to 2.0 degrees.

In another embodiment, a data storage device comprises magnetic recording head assembly configured to read from and write to a magnetic media, the assembly comprising a load, a suspension coupled to the load, and a slider coupled to the suspension. The slider comprises one or more read elements and one or more write elements. The data storage device further comprises a back plate having one or more fillet edges disposed adjacent to the slider. The magnetic media is disposed between the slider and the back plate, the magnetic media comprising a first surface spaced a first distance from the slider and a second surface spaced a second distance from the back plate. The one or more fillet edges cause an air film to be disposed between the second surface of the magnetic media and the back plate, the air film supporting the magnetic media.

The thickness of the air film and the second distance are dependent on at least one of the one or more fillet edges of the back plate and a velocity of the magnetic media. A first fillet edge of the one or more fillet edges is disposed between the first surface and a leading edge surface of the back plate. The first fillet edge has length from the leading edge surface to the first surface between about 0.01 mm and about 0.50 mm. A second fillet edge of the one or more fillet edges is disposed between a trailing edge surface and the media facing surface of the back plate, the second fillet edge having a length from the trailing edge surface to the media facing surface of about 0.01 mm to about 0.50 mm. The first and second fillet edges each have a curvature between about 0.2 mm R to about 5.0 mm R, an angle between the media facing surface to a surface of the first fillet edge of about 0.01 degrees to 2.0 degrees, or a recessed depth from the media facing surface of the back plate of about 10 nm to about 1000 nm. The first distance is between about 5 nm and about 50 nm and the second distance is between about 10 nm and about 300 nm.

In another embodiment, the data storage device comprises a magnetic recording head assembly configured to read from and write to a magnetic media, the assembly comprising a load, a suspension coupled to the load, and a slider coupled to the suspension. The slider comprises one or more read elements and one or more write elements. The data storage device further comprises a back plate having one or more right angle edges disposed adjacent to the slider. The magnetic media is disposed between the slider and the back plate. The magnetic media includes a first surface spaced a first distance from the slider and a second surface contacting the back plate.

The back plate has a first roughness and the second surface of the magnetic media has a second roughness. The first roughness is about 5 nm and about 100 nm and the second roughness is between about 5 nm and about 100 nm. The magnetic media contacts the back plate at a first intersection of a leading edge and a media facing surface of the back plate and a second intersection of a trailing edge and a media facing surface of the back plate. A first right angle edge of the one or more right angle edges is disposed at the first intersection and a second right angle edge of the one or more right angle edges is disposed at the second intersection. The media facing surface intersects the leading edge at an angle between about 80 degrees to about 100 degrees. The media facing surface intersects the trailing edge at an angle between about 80 degrees to about 100 degrees.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a magnetic recording head assembly configured to read from and write to a magnetic media, the assembly comprising a slider comprising one or more read elements and one or more write elements; and
   a back plate disposed adjacent to the slider, the back plate comprising a first surface having a roughness between about 5 nm and about 100 nm disposed at a media facing surface and one or more fillet edges disposed adjacent to the first surface, wherein the magnetic media is disposed between the slider and the back plate, wherein a first surface of the magnetic media has a roughness of about 5 nm to about 100 nm, the first surface of the magnetic media facing the first surface of the back plate.

2. The data storage device of claim 1, wherein an air film is disposed between the first surface of the back plate and the magnetic media, the magnetic media being spaced a distance from the first surface of the back plate between about 10 nm and about 300 nm.

3. The data storage device of claim 1, wherein the one or more fillet edges are two fillet edges disposed adjacent to the first surface of the back plate, and wherein each of the fillet edges is an arc, a straight chamfer, or stepped.

4. The data storage device of claim 1, wherein a first fillet edge of the one or more fillet edges is disposed between the first surface and a leading edge surface of the back plate, wherein the first fillet edge has length from the leading edge surface to the first surface between about 0.01 mm and about 0.50 mm.

5. The data storage device of claim 4, wherein the first fillet edge has a curvature between about 0.2 mm R to about 5.0 mm R.

6. The data storage device of claim 4, wherein the first fillet edge is recessed a depth of about 10 nm to about 1000 nm from the first surface of the back plate.

7. The data storage device of claim 4, wherein the first fillet edge is disposed at an angle between the first surface of the back plate and the leading edge surface of about 0.01 degrees to 2.0 degrees.

8. The data storage device of claim 1, wherein the data storage device is a tape embedded drive.

9. The data storage device of claim 1, wherein an air film is disposed between the first surface of the back plate and the magnetic media, and wherein the air film forms due to at least the roughness of the first surface of the back plate, the roughness of the first surface of the magnetic media, and the one or more fillet edges.

10. A data storage device, comprising:
    a magnetic recording head assembly configured to read from and write to a magnetic media, the assembly comprising:
    a load;
    a suspension coupled to the load; and
    a slider coupled to the suspension, the slider comprising one or more read elements and one or more write elements; and
    a back plate having one or more fillet edges disposed adjacent to the slider, the back plate comprising a first surface having a roughness between about 5 nm and about 100 nm, wherein the magnetic media is disposed between the slider and the back plate, the magnetic media comprising a first surface spaced a first distance from the slider and a second surface spaced a second distance from the first surface of the back plate, the second surface of the magnetic media having a roughness of about 5 nm to about 100 nm, wherein the one or more fillet edges cause an air film to be disposed between the second surface of the magnetic media and the first surface of the back plate, the air film supporting the magnetic media.

11. The data storage device of claim 10, wherein a thickness of the air film and the second distance are determined by at least one of a velocity of the magnetic media and the one or more fillet edges of the back plate.

12. The data storage device of claim 10, wherein a first fillet edge of the one or more fillet edges is disposed between a leading edge surface and a media facing surface of the back plate, the first fillet edge having a length from the leading edge surface to the media facing surface of about 0.01 mm to about 0.50 mm, and wherein a second fillet edge of the one or more fillet edges is disposed between a trailing edge surface and the media facing surface of the back plate, the second fillet edge having a length from the trailing edge surface to the media facing surface of about 0.01 mm to about 0.50 mm.

13. The data storage device of claim 12, wherein the first and second fillet edges each have a curvature between about 0.2 mm R to about 5.0 mm R, an angle between the media facing surface to a surface of the first fillet edge of about 0.01 degrees to 2.0 degrees, or a recessed depth from the media facing surface of about 10 nm to about 1000 nm.

14. The data storage device of claim 10, wherein the first distance is between about 5 nm and about 50 nm and the second distance is between about 10 nm and about 300 nm.

15. The data storage device of claim 10, wherein the data storage device is a tape embedded drive.

* * * * *